US006212599B1

United States Patent
Baweja et al.

(10) Patent No.: US 6,212,599 B1
(45) Date of Patent: Apr. 3, 2001

(54) METHOD AND APPARATUS FOR A MEMORY CONTROL SYSTEM INCLUDING A SECONDARY CONTROLLER FOR DRAM REFRESH DURING SLEEP MODE

(75) Inventors: Gunjeet Baweja, Sunnyvale; Navin Misra, Folsom, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/978,117

(22) Filed: Nov. 26, 1997

(51) Int. Cl.$^7$ .................................................. G06F 12/00
(52) U.S. Cl. ...................... 711/106; 711/105; 365/226; 365/227; 713/1
(58) Field of Search ...................................... 711/105–106; 713/320–324; 365/222, 229, 227, 226, 233, 230.04, 230.03

(56) References Cited

U.S. PATENT DOCUMENTS

| | | | |
|---|---|---|---|
| 5,365,487 | * | 11/1994 | Patel et al. ............................ 365/226 |
| 5,430,680 | * | 7/1995 | Parris .................................... 365/222 |
| 5,446,695 | * | 8/1995 | Douse et al. .......................... 365/222 |
| 5,654,930 | * | 8/1997 | Yoo et al. .............................. 365/222 |
| 5,682,498 | * | 10/1997 | Harness . |
| 5,796,992 | * | 8/1998 | Reif et al. .............................. 713/500 |
| 5,802,555 | * | 9/1998 | Shigeeda ............................... 711/106 |
| 5,815,043 | * | 9/1998 | Chow et al. ............................ 331/57 |
| 5,835,435 | * | 11/1998 | Bogin et al. .......................... 365/227 |
| 5,901,101 | * | 5/1999 | Suzuki et al. ......................... 365/222 |
| 5,940,851 | * | 8/1999 | Leung ................................... 711/106 |
| 5,963,103 | * | 10/1999 | Blodgett ................................. 331/75 |
| 5,974,501 | * | 10/1999 | Shaver et al. ......................... 711/105 |
| 5,987,589 | * | 11/1999 | Kawasaki et al. ..................... 712/32 |

OTHER PUBLICATIONS

"82371AB PCI ISA IDE Xcelerator (PIIX4), Suspend/Resume and Power Plane Control", Intel Corporation, pp. 219–250, 2000.*

* cited by examiner

Primary Examiner—Tuan V. Thai
Assistant Examiner—Pierre-Michel Bataille
(74) Attorney, Agent, or Firm—Blakely, Sokoloff, Taylor & Zafman LLP

(57) ABSTRACT

A method and apparatus for a memory control system is provided. The memory control system includes a first memory controller designed to access and refresh a DRAM, using a clock, during a first operation mode. The memory control system further includes a second memory controller designed to maintain the DRAM during a second operation mode and to exit from the second operation mode. During the second operation mode a clock or the clock and power is turned off to the first memory controller, and upon returning to the first operation mode, no initialization of the first memory controller is needed. Since a significant proportion of the power is consumed by the first memory controller, power savings results from employing this technique.

17 Claims, 9 Drawing Sheets

METHOD AND APPARATUS FOR A MEMORY CONTROL SYSTEM INCLUDING A SECONDARY CONTROLLER FOR DRAM REFRESH DURING SLEEP MODE

FIELD OF THE INVENTION

The present invention relates to computer systems, and more specifically, to power management in a computer system.

BACKGROUND OF THE INVENTION

Many of today's computer systems are mobile. In mobile computer systems, the control of the computer system may be split up between a main processor and a mobile system controller. The mobile system controller may control a dynamic memory and a cache.

Such mobile computer systems are generally powered by batteries at least some of the time. Users expect to use their mobile computer for a long time without recharging the batteries. Today's mobile computer systems extend battery life by creating more powerful batteries and/or by decreasing power consumption of the mobile computer system. One method of decreasing the power consumption of the computer system is to have a sleep mode.

The sleep mode involves turning off the power to at least some of the components of the computer system, thereby decreasing power consumption and increasing battery life. However, dynamic memory in the computer system has to be maintained even when the computer system is in sleep mode. The memory used in the computer system may be synchronous dynamic random access memory (SDRAM), extended data out random access memory (EDO DRAM), fast page mode (FPM) DRAM, or another type of dynamic random access memory (DRAM). All of these types of DRAM need be periodically refreshed in order to maintain the data values stored in them. In non-self-refresh type of DRAM, the system clock has to provide refresh signals to the DRAM. However, the system clock consumes power.

Some types of DRAM, including SDRAM, are able to execute self-refresh cycles. In the self-refresh cycle, the DRAM uses an internal clocking to refresh itself, and no external clocks are required. In these types of DRAM, power consumption is reduced by shutting off the system clock. Once the DRAM is placed into the self-refresh mode using a self-refresh command, the system clock may be turned off.

However, the memory controller needs to remain powered, to maintain the DRAM in the self-refresh mode and in order to exit from the self-refresh mode. Furthermore, if EDO DRAM is also included in the system, the system clock is needed to time refresh cycles for the EDO DRAM. The memory controller consumes power, as does the system clock. Because extending battery life is a goal, a system that permits reduction of the power consumed by the computer system during sleep mode is advantageous.

SUMMARY OF THE INVENTION

The present invention is a memory control system. The memory control system includes a first memory controller designed to access and refresh a DRAM using a clock, during a first operation mode. The memory control system further includes a suspend memory controller designed to maintain the DRAM during a second operation mode and to exit from the second operation mode. During the second operation mode the clock or both the clock and power are turned off to the first memory controller. Upon returning to the first operation mode from the second operation mode, the first memory controller does not need to be initialized again. Since a significant proportion of the power is consumed by the first memory controller, power consumption is reduced during the second operation mode using this system.

The present memory control system may support synchronous dynamic random access memory (SDRAM).

The present memory control system may also support both types of memory, SDRAM and EDO DRAM.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for a memory control system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

Overview

Figure 1:
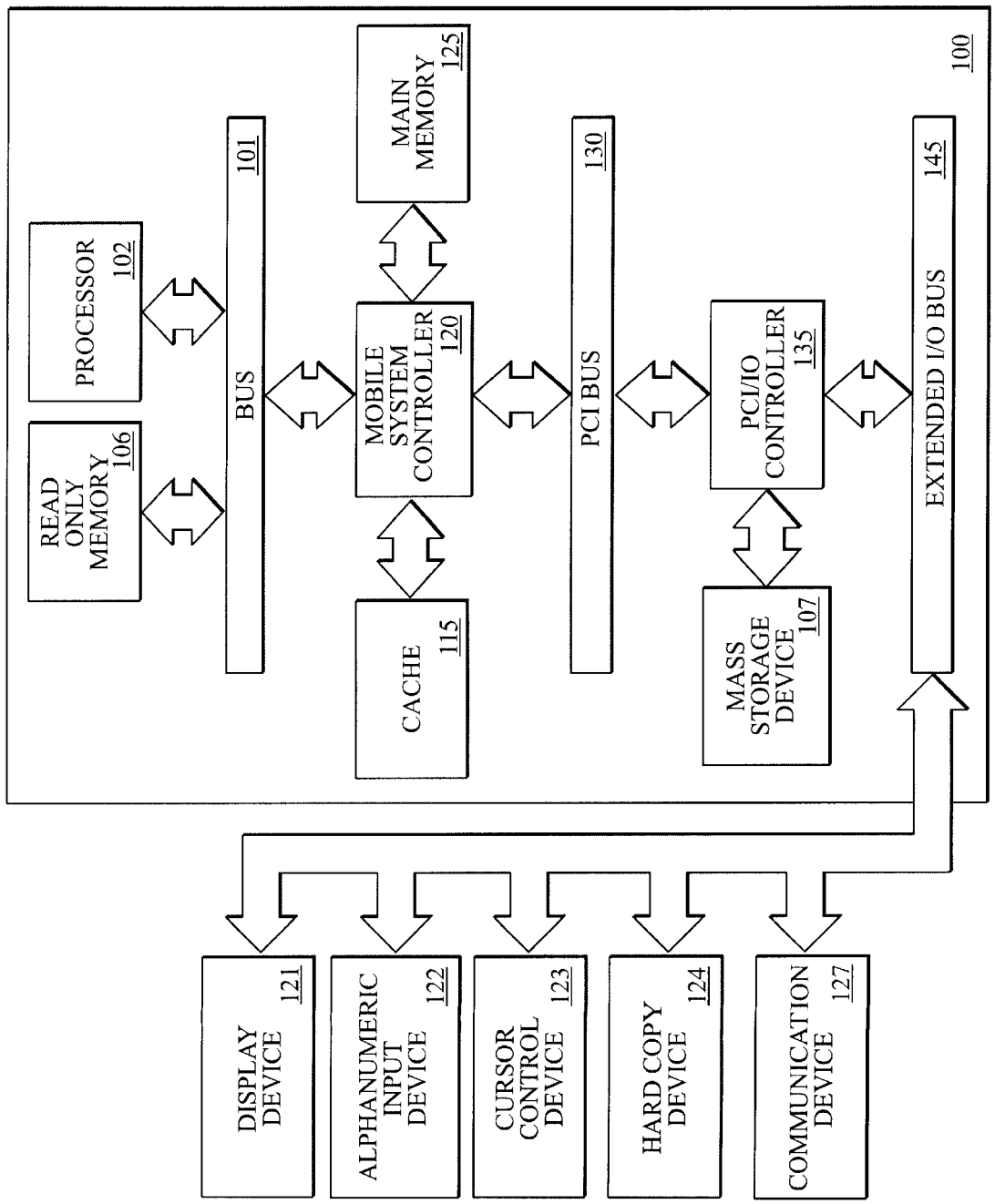
FIG. 1 is a block diagram of one embodiment of the computer system of the present invention.

FIG. 1 illustrates a block diagram of computer system in which the present invention may be implemented. Computer system 100 comprises a bus 101 or other communication means for communicating information, and a processor 102 coupled to bus 101 for processing information. Computer system 100 also comprises a read only memory (ROM) and/or other static storage device 106 coupled to bus 101 for storing information and instructions for processor 102.

The computer system 100 further comprises a main memory 125, a dynamic storage device for storing information and instructions to be executed. Main memory 125 also may be used for storing temporary variables or other intermediate information during execution of instructions. In one embodiment the main memory 125 is dynamic random access memory (DRAM). The computer system 100 also comprises a cache 115 for holding recently accessed data, designed to speed up subsequent access to the same data.

Computer system 100 further comprises a mobile system controller 120 coupled to the bus 101 to control access to the main memory 125 and cache 115. In one embodiment, the mobile system controller 120 includes a cache controller, a memory controller, and a bus controller. The mobile system controller 120 is coupled to a peripheral component interconnect (PCI) bus 130. Also coupled to the PCI bus 130 are PCI components, which are well known in the art and have not been shown to avoid obscuring the present invention.

Computer system 100 also includes a PCI input/output (I/O) controller 135 for controlling the I/O access to the mass storage device 107. A mass storage device 107 such as a magnetic disk or optical disk and its corresponding disk drive can be coupled to the PCI I/O controller 135. The PCI I/O controller 135 may also be coupled to an extended I/O bus 145 for connecting input and output devices to the computer system 100. In one embodiment, the processor 102, mobile system controller 120, and PCI I/O controller 135 are separate components in the computer system 100. Alternatively, functions of these components may be combined into one or more chips.

Computer system 100 can also be coupled via I/O bus 145 to a display device 121, such as a cathode ray tube (CRT) or liquid crystal display (LCD), for displaying information. An alphanumeric input device 122 is typically coupled to I/O bus 145 for communicating information and command selections to processor 102. Another type of user input device is cursor control device 123, such as a mouse, a trackball, trackpad, or cursor direction keys for communicating direction information and command selections to processor 102 and for controlling cursor movement on display device 121. Alternatively, other input devices such as a stylus or pen can be used to interact with the display. The computer system 100 can also be coupled via I/O bus 145 to a hard copy device 124 such as a printer. The computer system 100 may further be coupled via the I/O bus 145 to a communication device 127. The communication device 127 may be a speaker or microphone, or other device to communicate between a user and a computer system 100. Alternatively, these devices may be coupled to the computer system 100 via the PCI bus 130, or bus 101.

The present invention is related to power management in a computer system 100. According to one embodiment, power management is performed by computer system 100 in response to the processor 102, the mobile system controller 120 and/or the PCI I/O controller 135 executing sequences of instructions contained in main memory 125. Execution of the sequences of instructions causes the computer system 100 to enter into a sleep mode, as will be described hereafter. In alternative embodiments, circuit logic internal to the computer system 100 may be used in place of, or in combination, with software to implement the present invention. Thus, the present invention is not limited to any specific hardware and software, or combination of the two.

A memory control system including a first memory controller is described. The memory control system is designed to enter the first memory controller into sleep mode, turning power off to the first memory controller. The contents of the DRAM are maintained even when clocks and/or power to the majority of the system is shut off. The present memory control system may be used with various memory types, and combinations of memory types, including synchronous DRAM, extended data out DRAM(EDO DRAM), fast page mode DRAM (FPM DRAM), and others.

Figure 2:
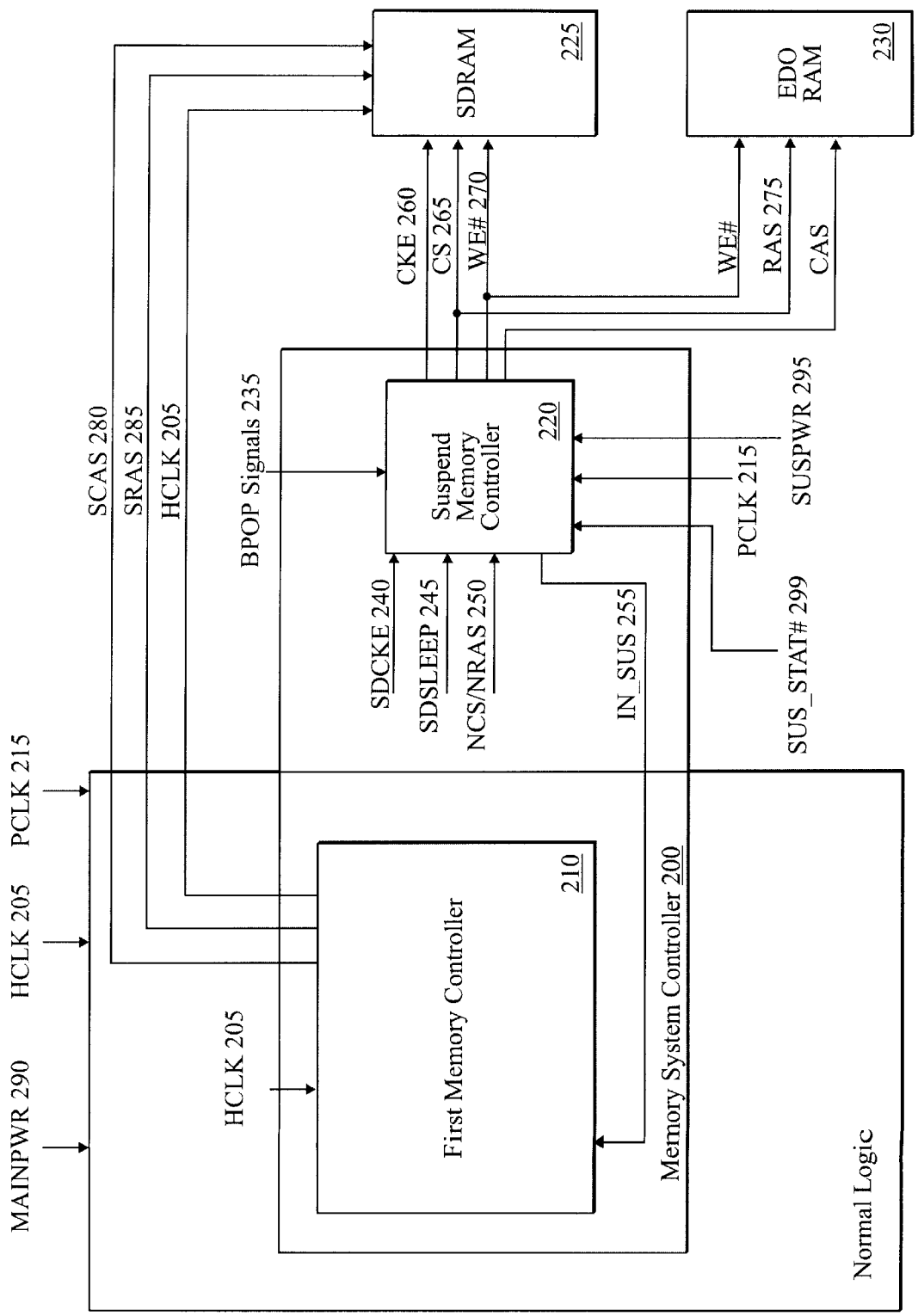
FIG. 2 is a block diagram of one embodiment of the memory control system of to the present invention.

FIG. 2 is a block diagram of one embodiment of the memory management system of the computer system of present invention. Memory system controller 200 accesses and controls memory in the computer system. Memory system controller 200 has two input clocks HCLK 205 and PCLK 215. The HCLK 205 is the host bus clock and is used by processor and memory system controller 120. The PCLK 215 is the PCI clock shared by memory system controller 120 and PCI devices. In one embodiment, HCLK 205 is a 66 MHz clock and PCLK 215 is a 33 MHz clock.

The majority of the logic within the memory system controller 200 is connected to main power, MAINPWR 290, which is the primary power connection, supplying power to most of the computer system. In one embodiment MAINPWR 290 is coupled to the PCI I/O controller 135. Some of the logic within the memory system controller 200 connected to SUSPWR 295. The logic that is connected to MAINPWR 290 is referred to as normal logic, the logic that is connected to the SUSPWR 295 is the suspend well. The portion of the memory system controller 200 which is normal logic is the first memory controller 210. The portion of the memory system controller 200 which is within the suspend well is the second memory controller 220, or suspend memory controller 220.

One embodiment of the computer system of the present invention has two sleep modes. The first sleep mode is referred to herein as the Stop Clock sleep mode (SC mode), during which clocks HCLK and PCLK are turned off. The second sleep mode is referred to herein as the Suspend-to-RAM sleep mode (STR mode), during which both the clocks and the MAINPWR 290 are turned off. During the STR mode, the suspend well containing the suspend memory controller 220 is powered by SUSPWR 295.

Because the suspend well remains powered even in sleep mode, the size of the suspend well is reduced in order to reduce the power consumption of the circuit during the sleep mode, and thereby extend the battery life. During normal operation, the suspend memory controller 220 acts as part of the memory system controller 200. However, during sleep mode, the first memory controller 210 is disconnected from the clock and/or power, and the suspend memory controller 220 acts as the memory controller. The suspend memory controller 220 refreshes the memory in the sleep mode and exits the first memory controller 210 from sleep mode at the appropriate time.

The SDRAM 225 is accessed and refreshed synchronously, using the HCLK signal 205 in the fully powered mode, referred to herein as normal operation mode. The commands to the SDRAM, during normal operation mode, are sampled by strobing the CS 265, SRAS 285, SCAS 280, WE# 270, and CKE 260 signals at the positive edge of HCLK signal 205. The function of these signals is described in more detail, for example, in the data sheet for the IBM0364404C 64Mb Synchronous DRAM manufactured by IBM Corporation of Armonk, New York. Additionally, these and other signals are described in more detail below. The EDO DRAM 230 is refreshed by a CAS before RAS refresh. In one embodiment, the EDO DRAM 230 may have a self-refresh mode.

Figure 3:
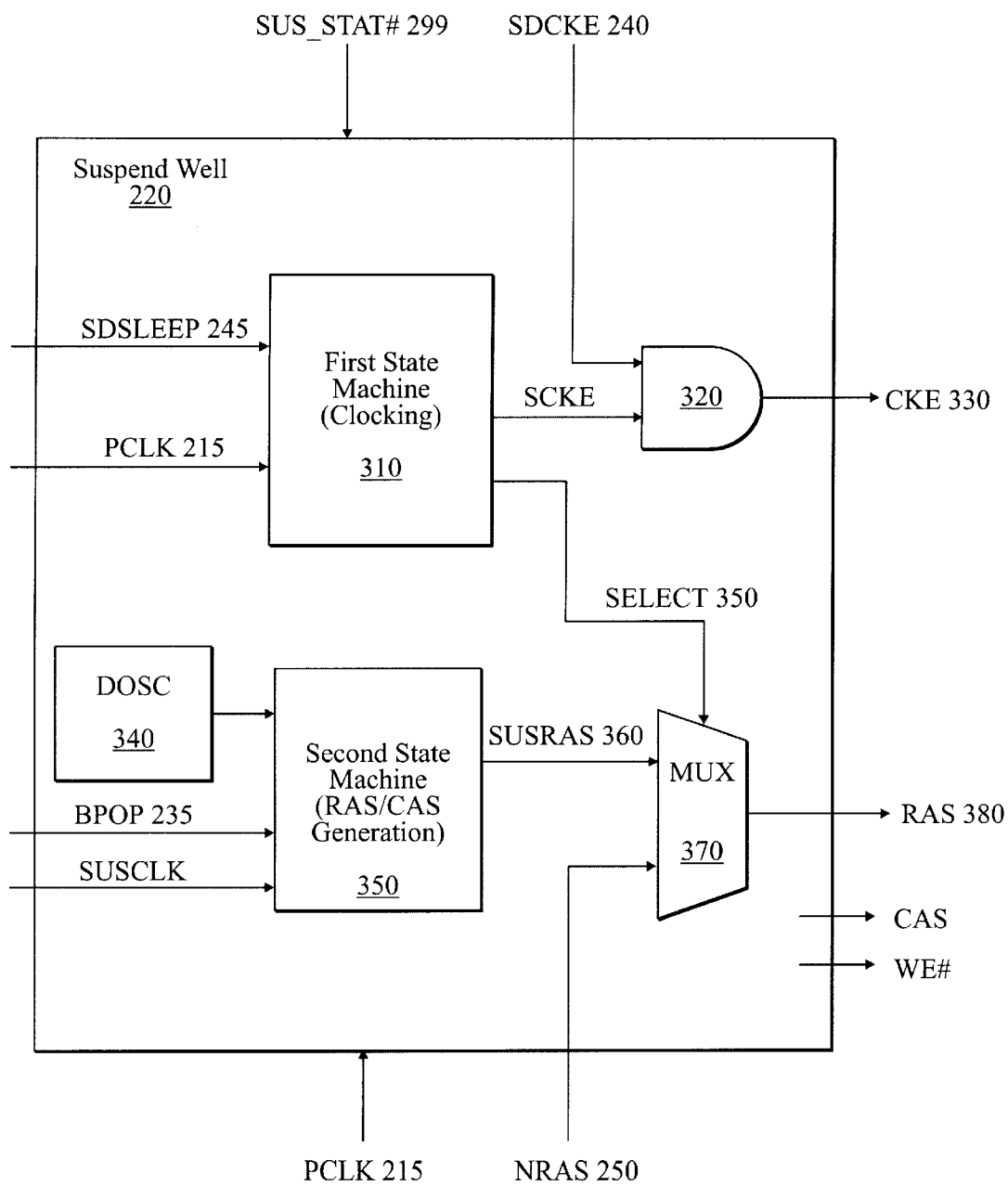
FIG. 3 is a block diagram of one embodiment the suspend memory controller of the present system.

FIG. 3 is a block diagram of one embodiment of the suspend memory controller 220 of the present system. The suspend memory controller 220 has as an input the SUS_STAT# signal 299, which goes low in order to indicate entry into the sleep mode. Depending on the type of sleep mode, the STR or SC mode, either clocks are turned off or both clocks and main power are turned off to normal logic. The entry and exit from the sleep modes is described in more detail below.

The SDSLEEP 245 is an input to the suspend memory controller 220 from the normal logic. The PCLK signal 215 is also input to the suspend memory controller 220. The PCLK signal 215 and SDSLEEP signal 245 are input to a first state machine 310. The output of first state machine 310 is the SCKE signal 315. The SCKE signal 315 is an input to an AND logic circuit 320. The SDCKE signal 240, generated by the first memory controller 210, is the second input to the AND logic circuit 320.

The output of the AND logic circuit 320 is a CKE signal 330, a clock enable signal. The CKE signal 330 is an input to the SDRAM 225 (not shown) and is used, along with other signals, to place the SDRAM into a self-refresh mode. When CKE signal 330 goes low, the SDRAM determines whether the CS# signal 265 is low and WE# signal 270 is high in the same clock cycle. If the CKE signal 330 and CS# signal 265 low and the WE# signal 270 high, the SDRAM enters into a self-refresh mode. The self-refresh mode is maintained by holding CKE low. The exit from self-refresh mode takes place when the CKE signal goes high.

Because the CKE signal is the output of an AND logic 320, if either SCKE or SDCKE signal is low, the CKE signal is low. Therefore, the status of the SDCKE signal 240 is irrelevant if the SCKE signal 315 is maintained low. The state machine 310 is responsible for maintaining the value of the SCKE signal during the sleep mode, when SDCKE 240 is high.

The bank population indication (BPOP) signal 235 is also input to the suspend memory controller 220. In one embodiment, the BPOP signal 235 indicates which memory banks are populated by EDO or FPM DRAM. When the SDRAM banks are in self-refresh mode, they need not be refreshed, therefore the BPOP signal 235 need not indicate the presence of SDRAM banks. The EDO or FPM DRAM can be either a self-refresh type EDO or non-self-refresh type EDO or FPM DRAM. In that case, the BPOP signal 235 may further indicate the type of EDO or FPM DRAM is present.

An internal ring oscillator, DOSC 340, is further included in the suspend memory controller 220. If there is DRAM which requires refreshing, such as EDO or FPM DRAM, the DOSC 340 is used to generate the refresh cycles. This allows the turning off of the PCLK signal 215. In one embodiment, the DOSC generates refresh cycles using the RAS, CAS, and WE# signals. In one embodiment, the DOSC 340 is disabled if the BPOP signal 235 indicates that there is only SDRAM in the system, and therefore the refresh cycles are not needed.

A second state machine 350 is used to generate signals for refreshing EDO or FPM DRAM. The second state machine 350 uses the BPOP signal 235 to generate a SUSRAS signal 360. The SUSRAS signal 360 is an input to a multiplexer (MUX) 370. The MUX 370 also has the normal RAS, (NRAS) 250, as an input. The NRAS signal 250 is generated by the first memory controller 210. The select signal 350 determines whether to select the SUSRAS 360 or NRAS signal 250. The select signal 350 is an output of the first state machine 310. The select signal 350 indicates whether the computer system is in normal operation mode or sleep mode. The output of the MUX 370 is the RAS signal 380 that is an output signal of the suspend memory controller 220. A CAS signal and WE signal are similarly generated.

In one embodiment, if a computer system only includes SDRAM 225, or other types of DRAM which have a self-refresh mode, the DOSC 340 and second state machine 350 may be eliminated.

Figure 4:
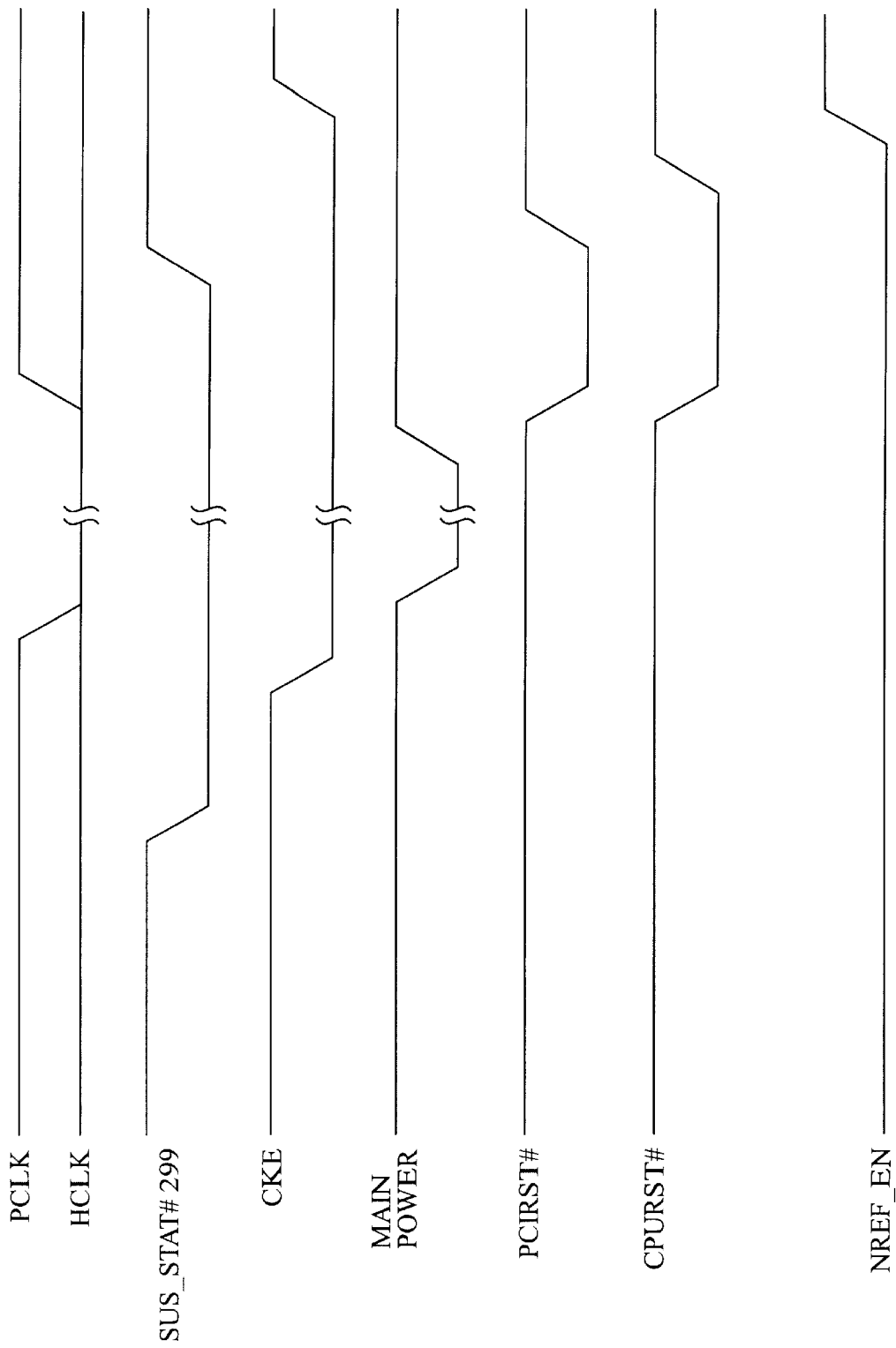
FIG. 4 is an overview timing wave form diagram of entry into and exit from sleep mode.

FIG. 4 is an overview timing wave form diagram of entry into and exit from sleep mode according to the present invention. The horizontal axis represents time units. The HCLK signal 205 is the clock which is used by the first memory controller 210. The PCLK signal 215, while it is on, is the clock used by the suspend memory controller 220.

The SUS_STAT# signal 299 initiates entry into the sleep mode. In one embodiment, the SUS_STAT# signal 299 is an active low signal. In one embodiment, the SUS_STAT# signal 299 is controlled by an external pin of the mobile system controller 120. In one embodiment, the external pin is asserted and deasserted by the PCI I/O controller 135.

A period of $t_{ref}$ elapses between the assertion of the SUS_STAT# signal 299 and the turning off of the clock signals PCLK 215 and HCLK 205. The period $t_{ref}$ is long enough to complete all pending refresh requests of all memory banks, complete entry into the sleep mode, and transfer control to the suspend memory controller 220. In one embodiment, the period $t_{ref}$ is 32 µs. The period during which the clocks/power is off can range from a few microseconds to hours. During Suspend-to-RAM (STR), MAINPWR 290 is turned off in addition to clock signals PCLK 215 and HCLK 205. In one embodiment, MAINPWR 290 is turned off slightly later than the PCLK signal 215 and HCLK signal 205. In another embodiment, MAINPWR 290 is turned off at the same time as the PCLK 215 and HCLK signal 205.

If the sleep mode is Suspend-to-RAM, and the MAINPWR 290 is turned off, the exit from the sleep mode is as follows. First, the MAINPWR 290 and the PCLK 215 and HCLK 205 are turned on. This restores power to the normal logic. Then, the PCIRST# signal 430 and CPURST# signal 460 are asserted. In one embodiment, the PCI reset signal, PCIRST# 430, is an external pin indicator which initiates the reset of the normal logic 200. In one embodiment, the PCIRST# signal 430 is triggered by the PCI I/O controller 135. In one embodiment, because power is turned off to most of the computer system, a CPU reset signal, CPURST# 460, is used to reset logic in the processor.

The CPURST# signal 460 and PCIRST# signal 430 are used to reset the registers. Because the registers in the normal logic 200 are not maintained during the power management mode, they may contain invalid values on power up. The PCIRST# signal 430 initiates this process for the PCI components, while the CPURST# signal 460 initiates this process for the CPU.

The PCIRST# 430 and CPURST# signals 460 are deasserted once the reset process is complete.

A period $t_d$ before PCIRST# 430 is deasserted, SUS_STAT# 299 is deasserted. The period $t_d$ allows the first state machine 310 to determine whether the exit is with or without PCIRST# 430. This determines whether the exit is from a Stop Clock or from a Suspend-to-RAM type of sleep mode.

As described below, the exit from Stop Clock, which does not require the PCIRST# signal 430, is different from exit from Suspend-to-RAM.

The CPURST# signal 460 is deasserted $t_c$ after the assertion of the PCIRST# signal 430. In one embodiment, both $t_d$ and $t_c$ are 32 µs. In one embodiment, while the PCIRST# signal 430 and CPURST# signal 460 are asserted, the processor 101 executes instructions to restore the contents of the registers to the state they were before to power-off. After register values are restored, NREF_EN register 440 is written to. In one embodiment, the NREF_EN register 440 is an internal register of the memory system controller 200. In one embodiment, the NREF_EN register 440 is updated by the processor 101. The NREF_EN register 440 is asserted to indicate that the registers have been restored to their pre-sleep mode state. The suspend memory controller 220 then transfers control back to the first memory controller 210. In one embodiment, the CKE signal 260 is deasserted at approximately the same time as the transfer of control.

If the sleep mode is a Stop Clock mode, the exit from the sleep mode is as follows. First, the clock signals PCLK 215 and HCLK 205 are turned back on. Because power was not removed from the normal logic, neither the PCIRST# 430 nor the CPURST# 460 signals are asserted. Additionally, since power was on, the register values need not be restored, and therefore the NREF_EN register 440 is not written to. Therefore, the SUS_STAT# signal 299 is asserted to initiate exit from the sleep mode. During the period $t_d$, the first state machine 310 determines that the PCIRST# signal 430 is not asserted.

Therefore, a period of time after the deassertion of the SUS_STAT# signal 299, control is transferred to the first memory controller 210 and the CKE signal 260 is deasserted.

SDRAM Application

The present system is used for memories including a synchronous dynamic random access memories (SDRAM).

Figure 5:
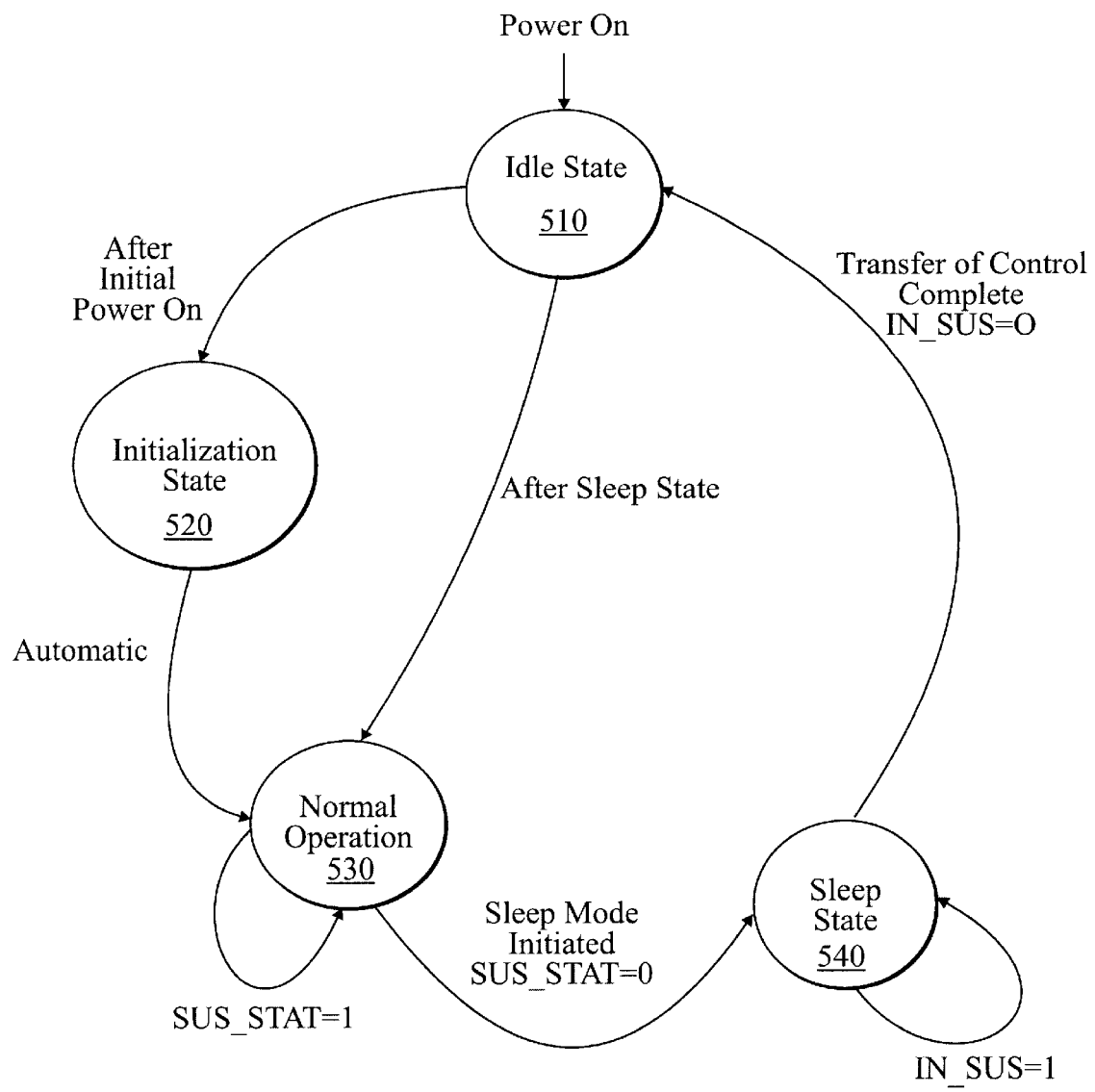
FIG. 5 is a state diagram of the memory controller.

FIG. 5 illustrates a simplified state diagram for a first memory controller 210 according to the present invention. Upon power on, the first memory controller 210 is in the idle state 510. From the idle state 510, the first memory controller 210 moves to the initialization state 520 if the idle state 510 occurred the first time power is applied to the SDRAM. In the initialization state 520, the SDRAM is initialized according to its specification. Initialization destroys any information stored in the SDRAM.

From the initialization state 520, the first memory controller 210 moves to the normal operation state 530. In the normal operation state 530, the first memory controller 210 accesses the memory and refreshes the memory. In one embodiment, the SDRAM is refreshed in the normal operation state 530 using CAS-before-RAS (CBR) refresh operations.

Transition to the sleep state 540 may be triggered by an indicator signal, SUS_STAT# 299, being asserted (i.e., going low). When the SUS_STAT# signal 299 is asserted, the first memory controller 210 moves to a sleep state 540.

Once SUS_STAT# signal 299 is asserted, the first memory controller 210 moves into the sleep state 540. In the sleep state 540, the first memory controller 210 completes the pending refresh cycles for the DRAM banks. Then the SDRAM banks are placed into the self-refresh mode. The control for maintaining the SDRAM memory in self-refresh mode is transferred over to the suspend memory controller 220. The details of this operation are explained below using a timing diagram.

When the IN_SUS signal 255 goes low, indicating the completion of the transfer of control to the suspend memory controller 220, the first memory controller 210 moves back to the idle state 510. The clock to the first memory controller 210 is turned off. Additionally, the power to the first memory controller 210 may be turned off. The timing of these actions is shown in more detail in FIG. 6 below.

Upon waking up from the idle state 510, the system moves directly to the normal operation state 530 if the previous state was a sleep state 540. If the power to the first memory controller 210 was removed during the sleep mode, after reset the state machine will be in an idle state 510. After waking up, during the transition from the idle state 510 to the normal state 530, the initialization state 520 is avoided. This maintains the data in the memory.

Figure 6:
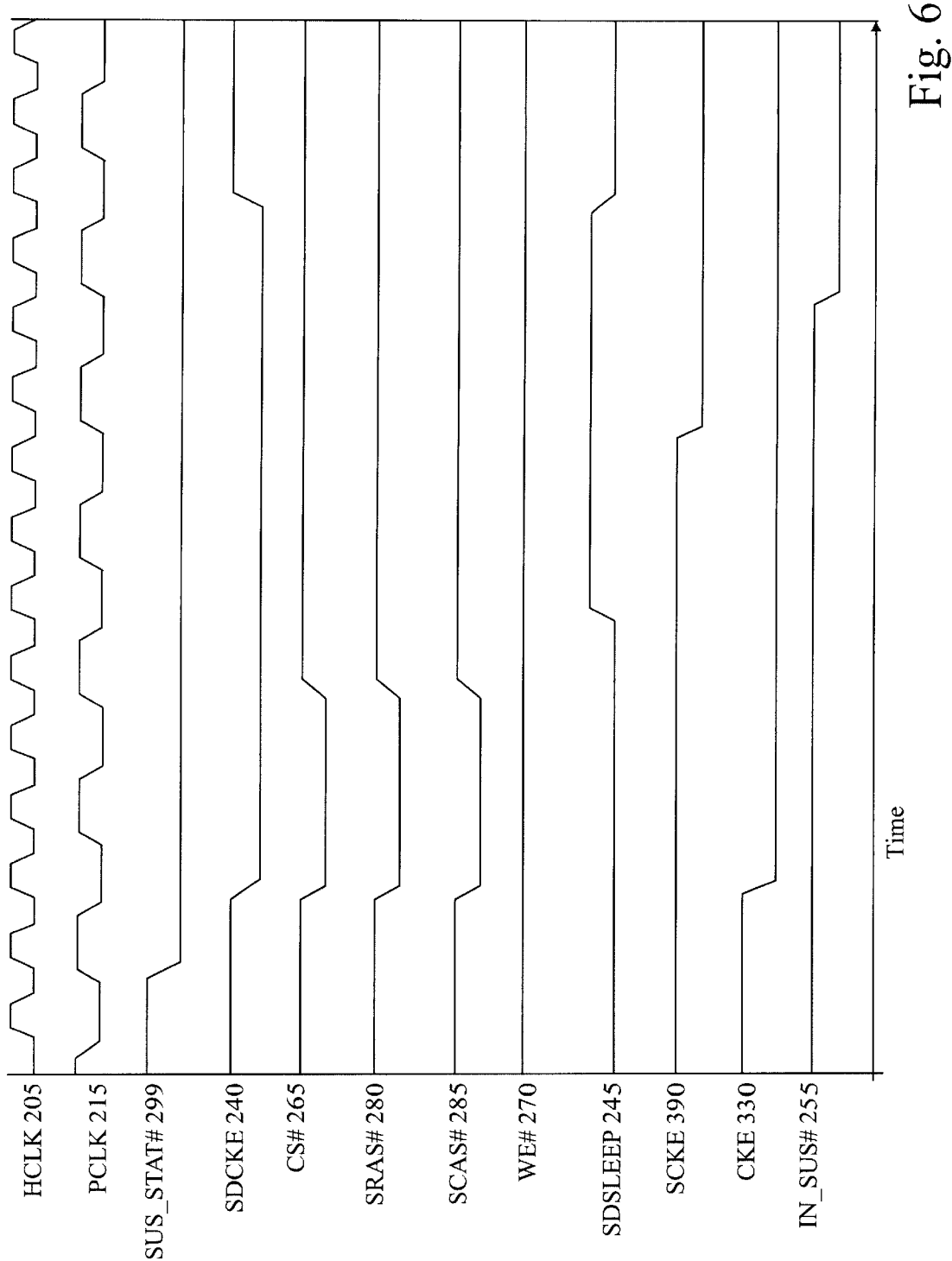
FIG. 6 is a timing wave form diagram of entry into the sleep mode for memory banks including SDRAM banks.

FIG. 6 is a timing wave form diagram of the sleep mode with memory banks including SDRAM banks. FIG. 6 represents the period of initial entry into the sleep mode, labeled $t_{ref}$ in FIG. 4. The HCLK signal 205 is the clock used by the normal logic 200 and the first memory controller 210. The PCLK signal 610 is used by the PCI components and the suspend memory controller 220.

The SUS_STAT# signal 299 initiates the sleep mode, as described above with respect to FIG. 5. Once the SUS_STAT# signal 299 is asserted, all pending memory refresh cycles are completed (not shown in Figure). The SDRAM banks are then placed in a self-refresh mode. To accomplish this a self-refresh command is generated by the first memory controller. In one embodiment, the self-refresh command is when CKE 330, CS# 265, SRAS 280, and SCAS 285 signals are asserted, and WE# 270 is maintained high. In one embodiment, all of these signals are asserted, and WE# 270 is deasserted on the same clock edge of the HCLK signal 205. When the SDCKE signal 240 is low, the CKE signal 330 is also low, placing the SDRAMs in the self-refresh mode.

After the SDRAMs are in a self-refresh mode, the SDSLEEP signal 245 is asserted. The SDSLEEP signal 245 indicates to suspend memory controller 220 that the SDRAMs are in self-refresh mode. The suspend memory controller 220 then asserts SCKE signal 390 and generates the IN_SUS signal 255. The IN_SUS signal 255 indicates to the first memory controller 210 that control of the memory has been transferred to the suspend memory controller 220. The first memory controller 210 then moves to the idle state. The SDCKE signal 240, maintained by the first memory controller 210, is deasserted. However, the SCKE signal 390 of the suspend memory controller 220 maintains the CKE signal 330 low.

At this point, the SDRAMs are in a self-refresh mode, and the CKE signal 330 is maintained by the suspend memory controller 220. The clocks, HCLK 205 and PCLK 610, are turned off, and power may be removed from the first memory controller 210. The process of exiting from the sleep mode is described with respect to FIG. 7.

Figure 7:
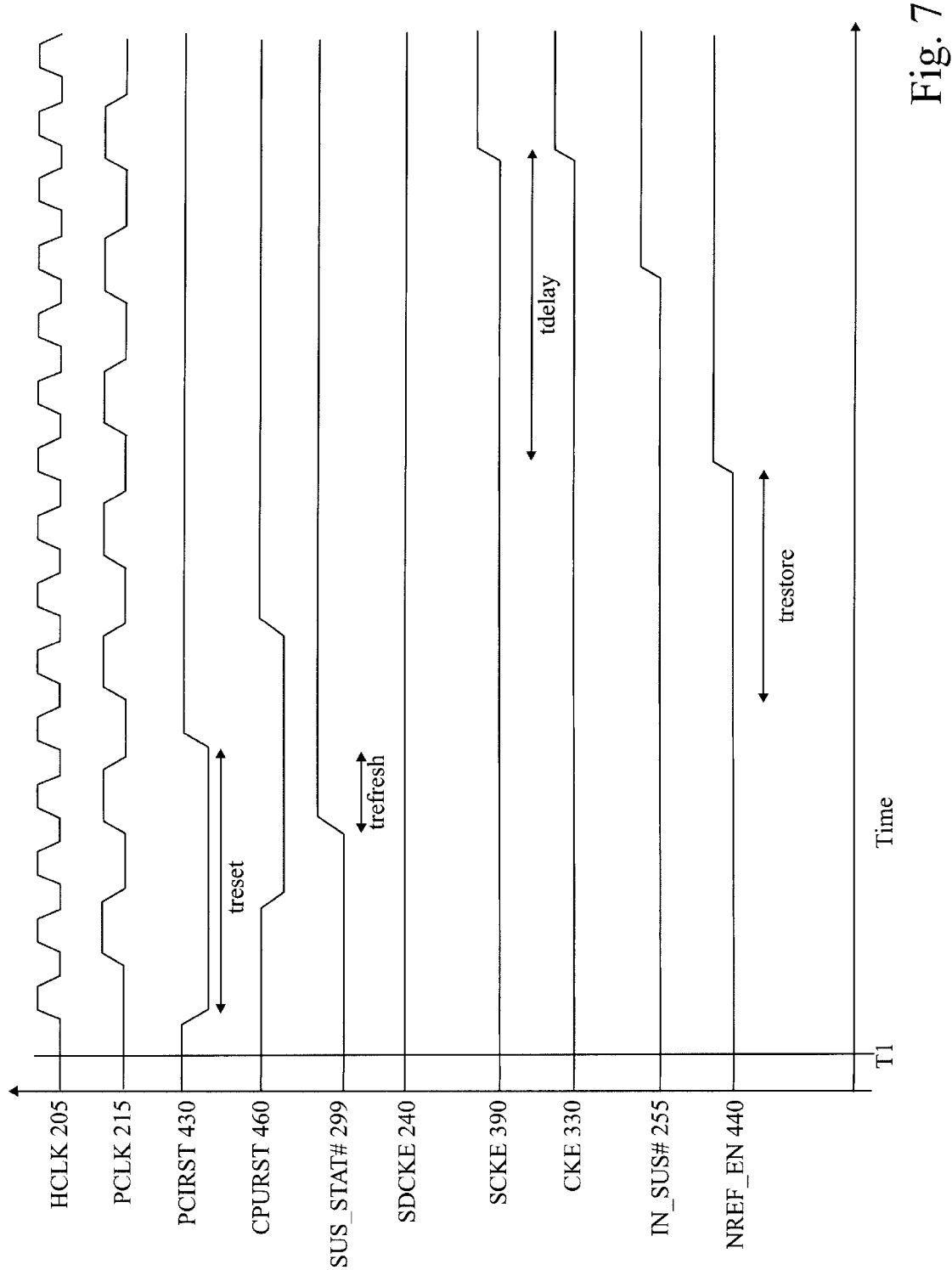
FIG. 7 is a timing wave form diagram of exit from the sleep mode for memory banks including SDRAM banks.

FIG. 7 illustrates a timing wave form diagram for exit from the Suspend-to-RAM sleep mode in which power to the first memory controller 210 is turned off.

The PCLK 215 and HCLK 205 are initially off. During the sleep mode the PCLK 215 is turned off, since it is not needed to refresh the memory or by the suspend memory controller 220. The MAINPWR signal 290, which provides power to the first memory controller 210 and other parts of the computer system 100, is off as well. The PCLK signal 215, HCLK signal 205, and MAINPWR signal 290 are turned on, preparation to the return to normal operation mode.

The PCIRST# signal 430 is asserted shortly after the PCLK signal 215 is turned on, initiating a reset of the registers and contents of the first memory controller 210. The PCIRST# signal 430 remains asserted for a $t_{reset}$ period. In one embodiment, the $t_{reset}$ period is 1 ms. During this time, control of the memory remains with the suspend memory controller 220.

While PCIRST# signal 430 is asserted, the SUS_STAT# signal 299 is deasserted. The SUS_STAT# signal 299 indicates to the suspend memory controller 220 that the exit from the sleep mode is imminent. In one embodiment, the SUS_STAT# signal 299 is deasserted $t_{refresh}$ prior to the deassertion of the PCIRST# signal 430. In one embodiment, the $t_{refresh}$ period is 32 μs.

The NREF_EN signal 440 is asserted $t_{restore}$ after the deassertion of the PCIRST# signal 430. The period $t_{restore}$ is used to restore registers to the state prior to entry into the sleep mode. The NREF_EN signal 440 corresponds to a register written to by the computer system 100 to indicate that the registers are restored. After the NREF_EN signal 440 is asserted, it is guaranteed that the control will transfer to the normal logic within a period of $t_{transfer}$. In one embodiment, the period $t_{transfer}$ is 32 µs. After the period $t_{transfer}$ is over, the control is transferred back to the first memory controller.

The SCKE signal 390 is deasserted $t_{delay}$ after the NREF_EN signal 440 is asserted. Because the CKE signal 260 is generated from a logical AND of the SDCKE signal 240 and the SCKE signal 390, the CKE signal 260 is deasserted concurrently with the SCKE signal 390. The period $t_{delay}$ is sufficient to complete pending refresh cycles, transfer control from the second memory controller 220 to the first memory controller 210, and take SDRAM out of self-refresh mode. In one embodiment, the $t_{delay}$ period is 32 µs. After the CKE signal 260 is deasserted, the memory is in normal operation, and the first memory controller 210 is controlling the memory. In one embodiment, when a DRAM access cycle is initiated, the first memory controller transitions from the idle state 510 to the normal state 530.

The SDCKE signal 240, the clock enable signal of the first memory controller 210 is high while the first memory controller 210 is in the sleep mode and transitions out of the sleep mode. After the first memory controller 210 exits from the sleep mode, the SDCKE signal 240 remains high, until a new sleep period is initiated.

SDRAM and EDO DRAM Combination Application

Figure 8:
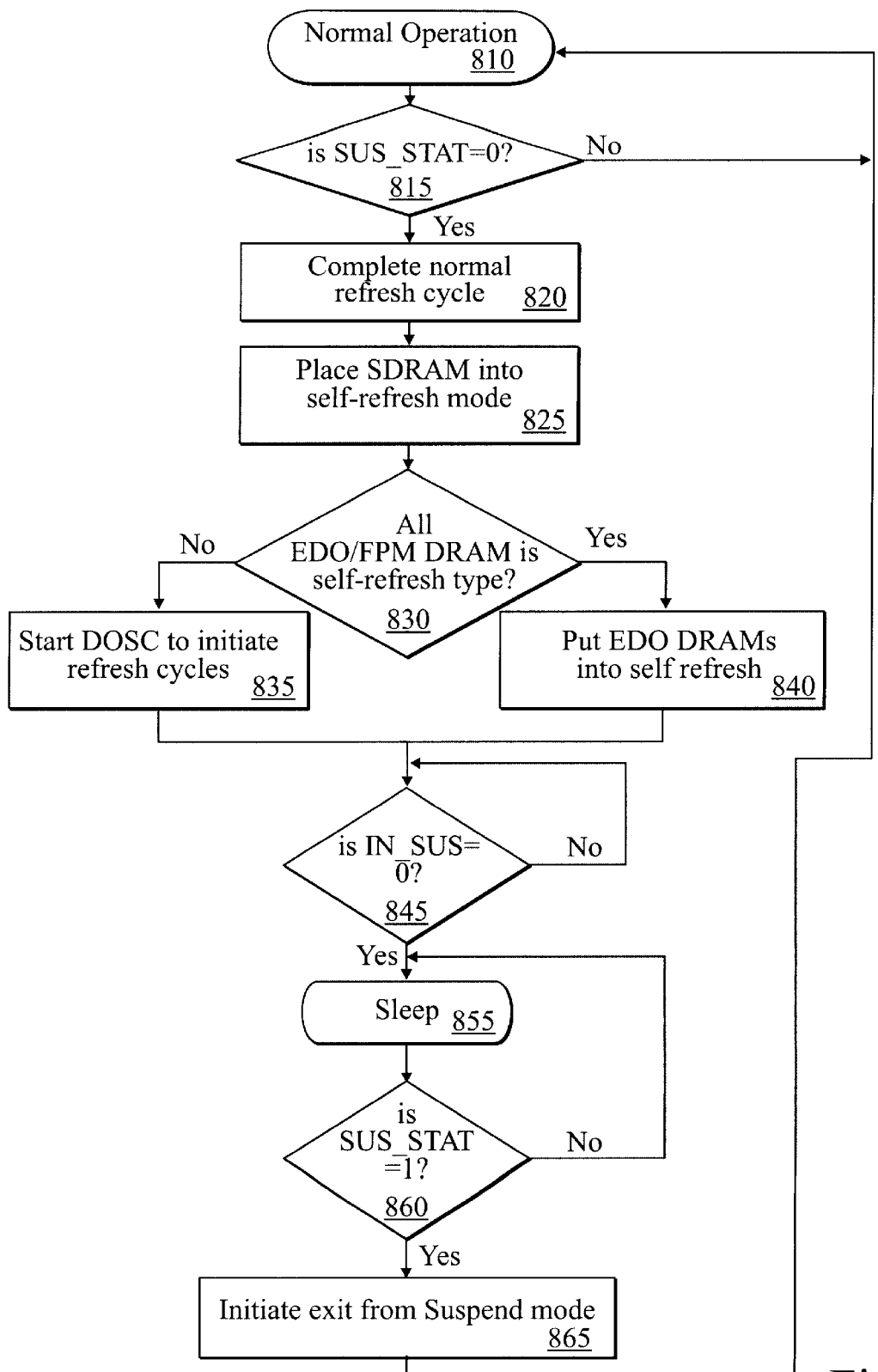
FIG. 8 is a flowchart of the refresh cycles for a memory system including EDO DRAM according to one embodiment of the present invention.

The present invention may also be used for a system including both SDRAM and EDO DRAM. FIG. 8 is a flowchart of the entry into and exit from sleep mode for a system including both SDRAM and EDO DRAM, according to the present invention. At block 810, the computer system is in the normal operation mode.

At block 815, the system tests whether the SUS_STAT# signal 299 has been asserted. The SUS_STAT# signal 299 initiates entry into the sleep mode. In one embodiment, the SUS_STAT# signal 299 is an active low signal, and therefore it is tested whether SUS_STAT# signal 299 is low. If the SUS_STAT# signal 299 is not low, the system returns to normal operation, at block 810. In one embodiment, this is an interrupt driven system. Thus, there is no query of the status of the SUS_STAT# signal 299. Rather, when the SUS_STAT# signal 299 is asserted, an interrupt is sent, and the system moves to block 820.

At block 820, all pending refresh cycles are completed. In this way, there are no pending refreshes in the queue when the sleep mode is initiated.

At block 825, the SDRAM are placed into self-refresh mode. This is accomplished using the process described above with respect to FIG. 6.

At block 830, the system determines the type of DRAM in each populated EDO DRAM bank. The two types of DRAM are self-refreshing and non-self-refreshing DRAM. If some of the EDO DRAM is non-self-refreshing, or there is FPM DRAM, the system goes to block 835. If all of the EDO DRAM is self-refreshing, the system continues to block 840.

At block 835, the internal ring oscillator (DOSC) is started. The internal ring oscillator is used to time refresh cycles for non-refresh DRAM.

At block 840, the DRAMs are placed in a self-refresh mode. In the self-refresh mode the DRAMs do not require external signals for clocking. Both blocks 840 and 835 continue to block 845.

At block 845, it is tested whether the IN_SUS# signal 255 has been asserted. In one embodiment, the IN_SUS# signal 255 is an active low signal, therefore the system tests whether the IN_SUS# signal 255 is zero. The IN_SUS# signal 255 is asserted by the suspend memory controller 220 when the suspend memory controller 220 has received control from the first memory controller 210. If the IN_SUS# signal 255 is not asserted, the system returns block 850. If the IN_SUS signal 255 is asserted, indicating that control has been taken over by the suspend memory controller 220, the system moves to block 855.

At block 855, the first memory controller 210 is in the sleep mode. In this state no clocks are connected to the first memory controller 210. In one embodiment, power is also removed from the first memory controller, and only the suspend memory controller 220 is powered. The EDO or FPM non-self-refreshing DRAMs, if any are present in the system, are refreshed at regular intervals by the suspend memory controller 220.

At block 860, the system queries whether the SUS_STAT# signal 299 is deasserted. The SUS_STAT# signal 299 indicates the exit form the sleep mode. If the SUS_STAT# signal 299 is not deasserted, the system cycles back to block 855, remains in the sleep mode, and queries again. If the SUS_STAT# signal 299 has been deasserted, the system continues to block 865, initiating exit from the sleep mode.

At block 865 the system exits from the sleep mode, and returns to the normal operation mode 810. The process is described above with respect to FIG. 7.

Figure 9:
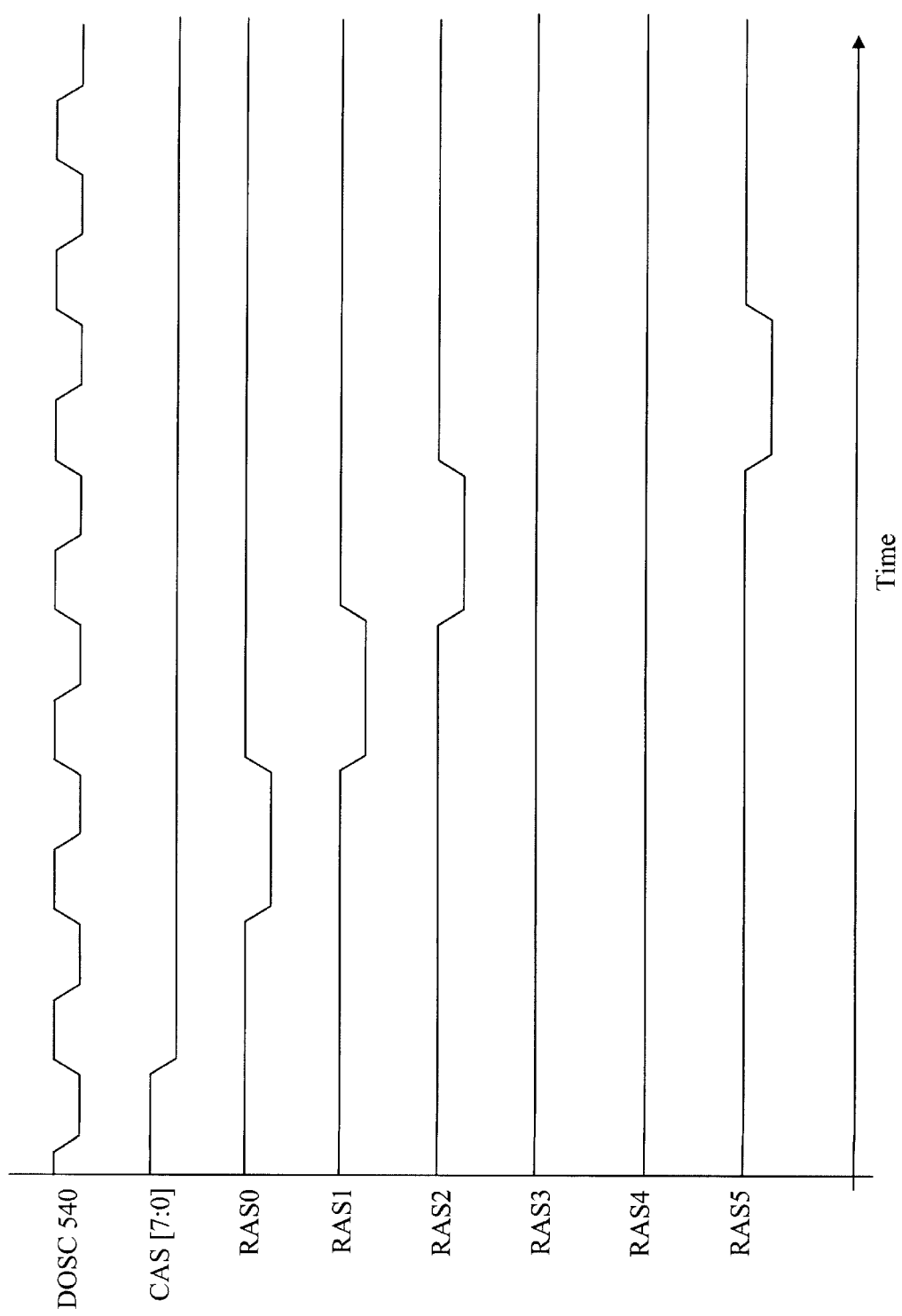
FIG. 9 is a timing wave form diagram of the sleep mode with memory banks including EDO DRAM and FPM DRAM banks.

FIG. 9 is a timing wave form diagram of a refresh cycle in the sleep mode for non-self-refreshing memory banks, including EDO or FPM DRAM banks. Note that FIG. 9 illustrates a time period when the system is in a sleep mode. Only a single refresh cycle is illustrated. The illustrated cycle is repeated at regular intervals. In one embodiment, the interval is determined based on the refresh period of the DRAM used.

A DOSC signal 900 is generated by an internal ring oscillator 340 (DOSC) within the suspend memory controller 220. The DOSC signal 900 is an oscillator having a period of $t_{osc}$. The period of the DOSC signal 900 is designed such that $t_{osc} > t_{min}$, where $t_{min}$ is the minimum time RAS signals 910–960 need to be asserted to refresh a row of memory. Thus, RAS signals 910–960 are asserted on a rising edge of the DOSC signal 900 and deasserted on the next rising edge. The CAS signal 970 is asserted to initiate a refresh cycle.

Each populated row of RAS 910, 920, 930 and 960 is asserted in sequence until all populated RAS 910, 920, 930 and 960 have been asserted. The RAS 940. 950 associated with unpopulated rows, RAS3 and RAS4, are not asserted. In one embodiment, SDRAM and other DRAM may be mixed. Thus, the unpopulated rows RAS 3 940 and RAS4 950 may be either empty or populated with SDRAM. If any rows are populated by SDRAM, the sequence described in FIG. 6 is used to place the SDRAM in a self-refresh mode.

As can be seen, in the above description, the present invention is able to refresh a memory system which may include SDRAM, self-refreshing EDO/FPM DRAM, and other types of DRAM in a single system. This capability is advantageous as it permits mixing of memory types without losing the benefits of a sleep mode.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. The present invention should not be construed as limited by such embodiments and examples, but rather construed according to the following claims.

What is claimed is:

1. A memory control system comprising:
a first memory controller designed to access and refresh a dynamic random access memory (DRAM), using a clock, during a first operation mode; and
a second memory controller designed to maintain the DRAM during a second operation mode and to exit the first memory controller from the second operation mode, the second memory controller comprising:
a ring oscillator for refreshing non-self-refresh type of DRAM, wherein EDO DRAM banks are refreshed, and
wherein the second memory controller asserts a self-refresh signal to keep self-refresh type of DRAM in a self-refresh state,
the clock coupled to the first memory controller, the clock turned off during the second operation mode.

2. The memory control system of claim 1, wherein the DRAM is a synchronous DRAM (SDRAM).

3. The memory control system of claim 2, wherein the second memory controller maintains the SDRAM by asserting the self-refresh signal to keep the SDRAM in a self-refresh state.

4. The memory control system of claim 1, wherein the second memory controller further comprises the internal ring oscillator that refreshes the EDO DRAM by using a CAS-before-RAS type refresh cycle.

5. The memory control system of claim 4, wherein a period of the internal ring oscillator is greater than a time for which a row access select (RAS) signal is asserted in order to refresh a row of the EDO DRAM.

6. The memory control system of claim 1, wherein a period of the ring oscillator is greater than a time for which a row access select signal is asserted in order to refresh a row of the EDO DRAM.

7. The memory control system of claim 1 further comprising:
first power connection removed from the first memory controller during the second operation mode; and
wherein the first memory controller, upon exit from the second operation mode, is not reset and takes over control from the second memory controller.

8. A memory control system comprising:
a dynamic random access memory (DRAM) including synchronous dynamic random access memory (SDRAM);
a first memory controller for controlling the DRAM during a first operation mode, the first memory controller including a first power connection; and
a second memory controller designed to maintain the DRAM during a second operation mode, the second memory controller including a second power connection, the second memory controller generating:
a first signal to indicate to the first memory controller that the second memory controller is controlling the DRAM;
a second signal to maintain the SDRAM in a self-refresh mode; and
a third signal to indicate to the first controller an exit from the second operation mode, such that the first memory controller need not be initialized in order to receive control from the second memory controller;
wherein the first power connection may be disconnected during the second operation mode, such that the second memory controller remains powered by the second power connection and maintains the DRAM.

9. The memory control system of claim 8, wherein the DRAM further includes extended data out (EDO) DRAM.

10. The memory control system of claim 9, wherein the second memory controller further generates a fourth signal that refreshes the EDO DRAM by using a CAS-before-RAS type refresh cycle.

11. The memory control system of claim 10, wherein the second memory controller is further designed to receive a bank population signal, indicating memory banks of the DRAM which are occupied by the EDO DRAM, and wherein the fourth signal only refreshes the memory banks that are occupied by the EDO DRAM.

12. The memory control system of claim 8, wherein the first memory controller is further designed to receive a sleep signal initiating entry into the second operation mode, and wherein the first memory controller further a self-refresh signal in response to the sleep signal, to place the SDRAM into the self-refresh mode.

13. The memory control system of claim 12, wherein the second memory controller is further designed to receive the self-refresh signal from the first memory controller, and generate the second signal in response to receive the self-refresh signal.

14. The memory control system of claim 12, wherein the second memory controller further comprises a logic block for evaluating the logical function of the self-refresh signal and the second signal, the output of the logic function controlling the SDRAM's self-refresh mode.

15. The memory control system of claim 14, wherein the logic block comprises an AND function, and wherein the self-refresh signal and the second signal are active low signals.

16. The memory control system of claim 8 further comprising:
a second power connection coupled to the second memory controller, the second power connection maintained during the second operation mode; and
wherein the first memory controller, upon exit from the second operation mode, is not reset and takes over control from the second memory controller.

17. A memory control system comprising:
a first memory controller designed to access and refresh a DRAM, using a clock, during a first operation mode;
a second memory controller designed to maintain the DRAM during a second operation mode and to exit the first memory controller from the second operation mode, wherein the second memory controller is further designed to receive a bank population signal, indicating memory banks of the DRAM which are occupied by a first type of DRAM, and wherein only those memory banks of the DRAM that are occupied by the first type of DRAM are refreshed; and
a first power connection removed from the first memory controller during the second operation mode, wherein the first memory controller, upon exit from the second operation mode, is not reset and takes over control from the second memory controller.

* * * * *

UNITED STATES PATENT AND TRADEMARK OFFICE
CERTIFICATE OF CORRECTION

PATENT NO.    : 6,212,599 B1
DATED         : April 3, 2001
INVENTOR(S)   : Baweja et al.

Page 1 of 1

It is certified that error appears in the above-identified patent and that said Letters Patent is hereby corrected as shown below:

<u>Column 1,</u>
Line 36, delete "need be" and insert -- need to be --.

Signed and Sealed this

Seventh Day of May, 2002

Attest:

Attesting Officer

JAMES E. ROGAN
*Director of the United States Patent and Trademark Office*